July 7, 1931.  V. A. SCHOENBERG  1,813,204
RADIO PHOTOGRAPHY TRANSMITTER
Filed Aug. 1, 1929  3 Sheets-Sheet 1
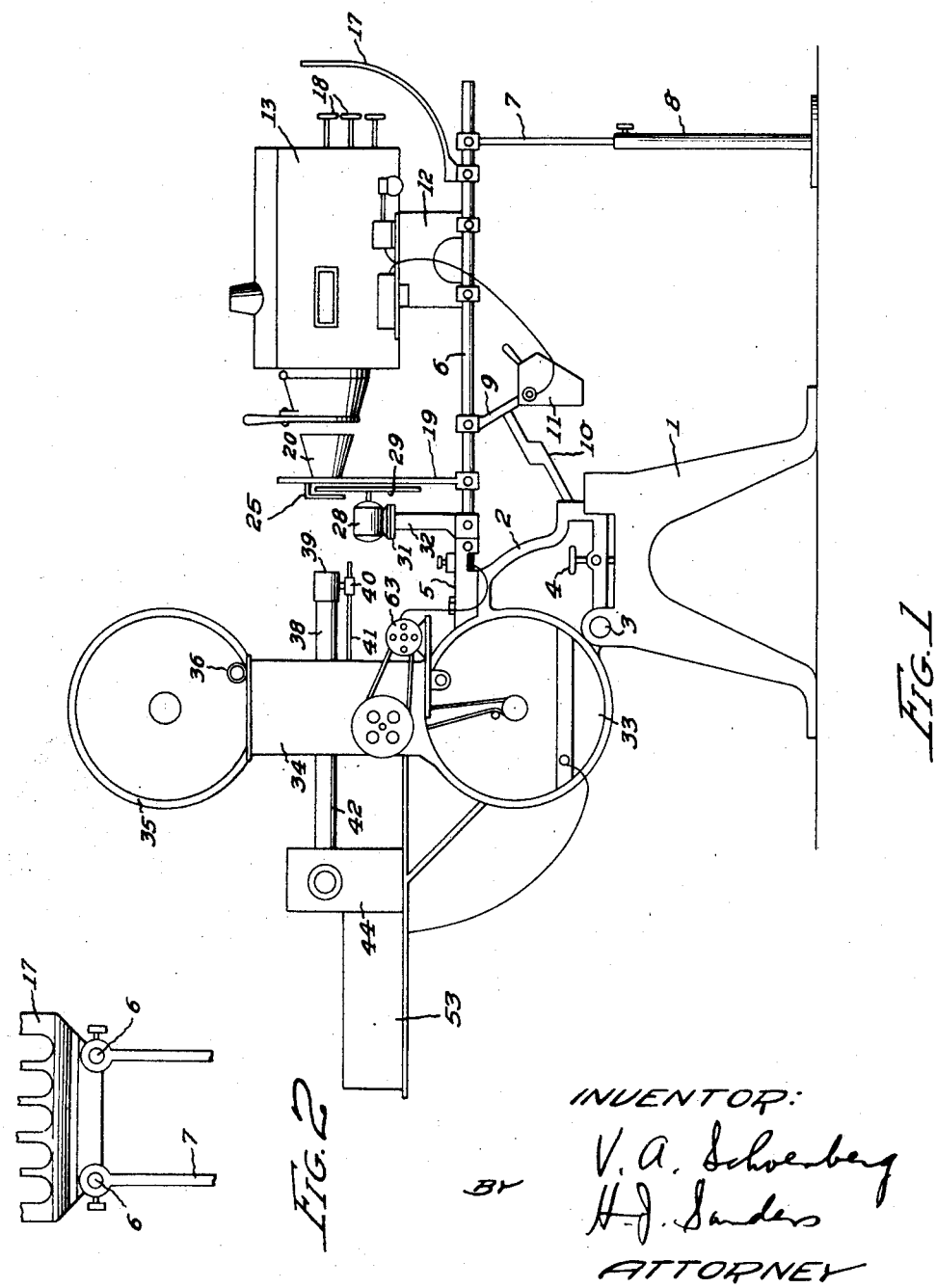

July 7, 1931. V. A. SCHOENBERG 1,813,204
RADIO PHOTOGRAPHY TRANSMITTER
Filed Aug. 1, 1929  3 Sheets-Sheet 2

INVENTOR:
V. A. Schoenberg
BY H. J. Sanders
ATTORNEY

July 7, 1931. V. A. SCHOENBERG 1,813,204
RADIO PHOTOGRAPHY TRANSMITTER
Filed Aug. 1, 1929   3 Sheets-Sheet 3
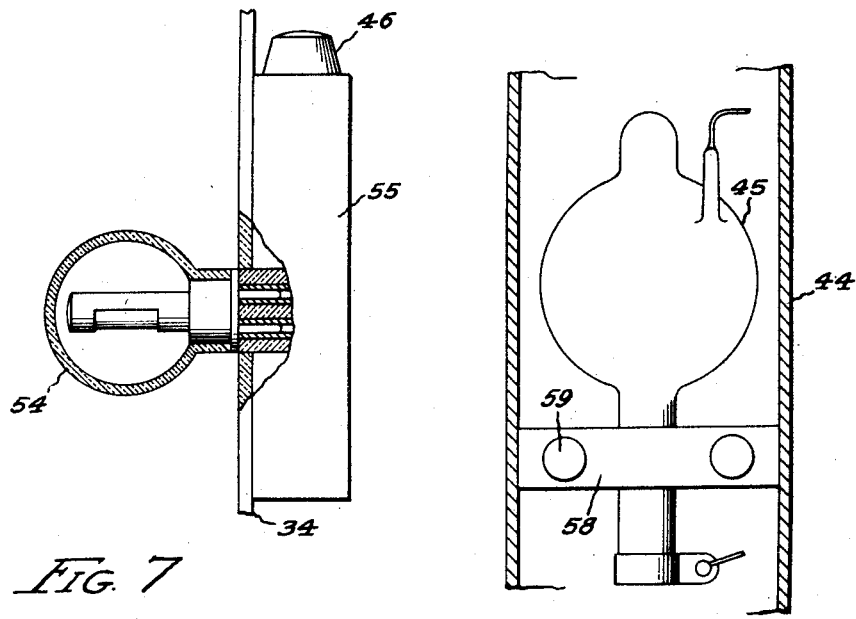
FIG. 7
FIG. 8
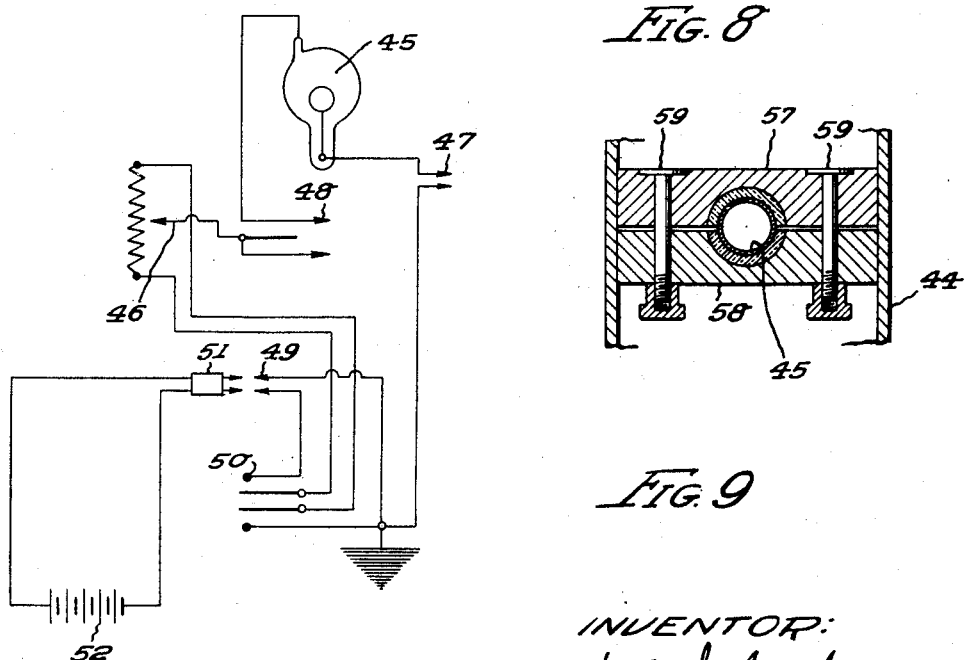
FIG. 9
FIG. 10
INVENTOR:
V. A. Schoenberg
BY H. J. Sanders
ATTORNEY Patented July 7, 1931

1,813,204

UNITED STATES PATENT OFFICE

VIRGIL ADOLF SCHOENBERG, OF NILES CENTER, CHICAGO, ILLINOIS

RADIO PHOTOGRAPHY TRANSMITTER

Application filed August 1, 1929. Serial No. 382,750.

This invention relates to improvements in radio photography transmitters. One object is to provide a radio photography transmitter wherein a plurality of units are adjustably mounted upon a framework so that a proper focusing of the units is readily had. A further object is to provide a mounting for the transmitter assembly that can be tilted about a pivotal point, as a unit, so that all elements may be corrected to and maintained in horizontal position. A still further object is to provide a scanning disc having its perforations arranged in a true circle thereby assuring a continuous and non-intermittent transmission. A still further object is to provide means for regulating the admission of light horizontally and vertically from the arc projector to avoid flooding of the film.

A further object is to provide a potentiometer hook-up that permits the operation of the photo-electric cell at its maximum efficiency at all times.

With the foregoing and other objects in view the invention consists in the combination and arrangement of parts to be hereinafter fully described, pointed out in the claims and illustrated in the accompanying drawings which form a part of this application for patent and in which—

Fig. 1 is a side view of a transmitter embodying the features of the present invention.

Fig. 2 is a fragmentary end view of Fig. 1.

Fig. 7 is an enlarged fragmentary sectional view of an alternative or substitute cell mounting that may be applied to the door of the film head.

Fig. 8 is a detail sectional view of the adjustable photo-electric cell mounting.

Fig. 9 is a cross section through Fig. 8.

Fig. 10 is a schematic view of the wiring for the photo-electric cell and potentiometer.

Figures 3, 4:
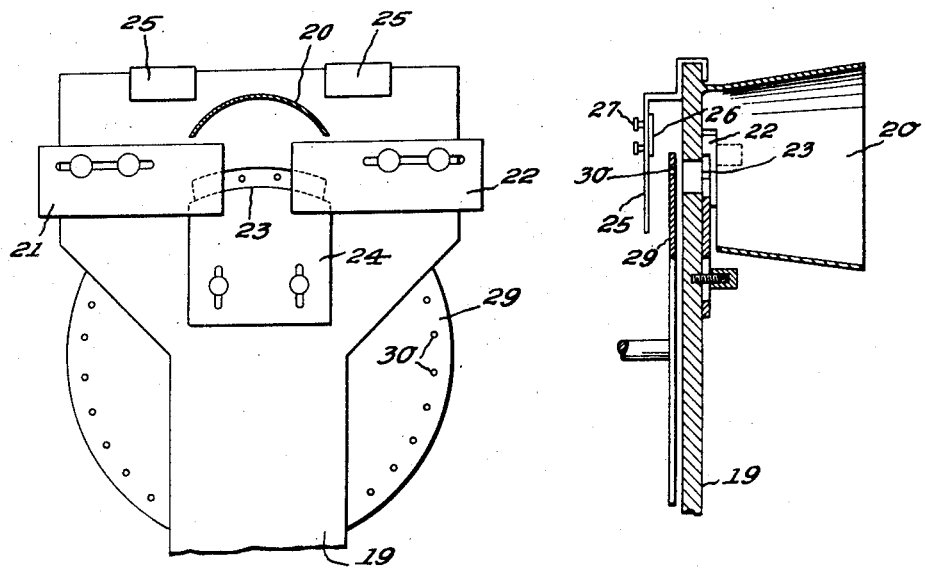
Fig. 3 is an enlarged fragmentary view of the framing device support.
Fig. 4 is a vertical sectional view through Fig. 3.
Figure 5:
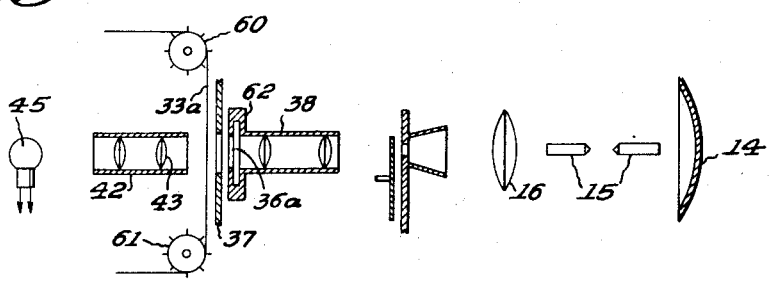
Fig. 5 is a chart view of the general assembly of the transmitter.
Figure 6:
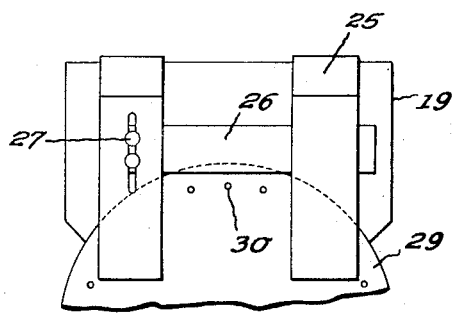
Fig. 6 is a fragmentary view of Fig. 3 in reversed position.

Like reference characters denote corresponding parts throughout the several views. The transmitter comprises a base 1 that serves as a support for the frame member 2 that is pivotally mounted at 3 in such manner that it can be tilted with respect to the base by manual operation of the hand screw 4 that connects it to the base, said hand screw having a lock-bolt arrangement to permit it to be locked in any adjusted position. Turning said screw in one direction forces it against the base causing the tilting movement of the frame 2.

By means of a spirit level (not shown) or other means mounted to the frame 2 its true horizontal position may be determined.

Carried by the frame 2 is a coupling member 5 that receives and supports the parallel outwardly extending rails 6, 6 that at their outer ends are adjustably supported by the vertical rods 7 that are telescopically received in the upstanding tubular members 8 rising from the floor line. Depending from the rails 6 are links 9 braced from the frame 2 by the angular links 10, said links 9 carrying the control or arc lamp power switch 11.

Adjustably mounted upon the rails 6 is a carriage 12 upon which is arranged the arc lamp housing 13 in which are the reflector 14, carbons 15 and the lens 16, a guard 17 adjustably mounted upon said rails in advance of the arc light housing protecting the controls 18 from disturbance after they have been properly adjusted.

Adjustably mounted upon the rails 6 is the framing support 19 that carries the cone shaped shield 20, the lower portion thereof being detached and spaced from the support 19 to afford clearance for the horizontally adjustable shields 21, 22 mounted to the support 19 and adapted to cover more or less of the end portions of the arcuate slot 23 formed in the shield 20. A vertically adjustable shield 24 mounted to the member 19 is adapted to move over and partially close or narrow the slot 23 throughout its length. Slidably supported upon the member 19 at its top edge and upon its opposite side with relation to the slides 21, 22, 24 are two spaced back framers 25, 25 connected by a cross link 26 that is adjustable vertically through the medium of screws 27 extending through vertical slots in the said members 25; said members 25, 26 serving to shade or shield the slot 23 from light rays and reflections.

Mounted fast to the shaft of the motor 28 is the scanning disc 29 disposed between the back framers 25 and support 19, said disc being formed with a plurality of perforations 30 arranged in a true circle, the perforated portion of said disc riding before the slot 23 in the member 19, the slides 21, 22 being so adjusted that but one perforation 30 can register with the non-shielded portion of said slot at a time. Referring again to the motor 28 the same is adjustable laterally upon its base 31 which is supported upon the standard 32 adjustably mounted upon the rails 6.

Fast to the frame 2 is the take-up film reel 33 receiving film 33a connected by film head 34 to the supply reel 35 that is provided with the speedometer 36 that registers the number of pictures per second passing the light admittance aperture 36a. It is the invention to provide an automatic fire shutter 37 to close the light aperture when the film is not in motion thus avoiding the fire hazard.

Mounted to the film head is the adjustable telescopic lens support and housing 38 that carries the lens 39 that is carried by the sliding shoe 40 arranged upon the guide rod 41 mounted to the film head. Mounted also to the film head is the lens housing 42 provided with lenses 43, which are adjustable, said housing at its outer end adjustably mounting the photo-electric cell housing 44 in which is located the photo-electric cell 45 and the potentiometer 46 and circuit therefor as shown in Fig. 10. This circuit comprises the output jack 47, test jack 48, in-put battery supply jack 49 and double pole switch 50, a battery supply plug 51 being provided to disengage the battery 52 mounted in casing 53.

As an alternative for the photo-electric cell housing 44 a cell 54 may be mounted in the door 55 of the film head 34 and in this construction opening of said door automatically breaks the electric circuit and closing said door closes the circuit making unnecessary the customary control switch, and having the photo-electric cell in close proximity to the moving film making focusing of lenses 43 unnecessary and permitting the use of a smaller and more sensitive photo-electric cell.

In Figs. 8 and 9 a clamp for the photo-electric cell is shown and it comprises the clamping members 57, 58 connected by the screws 59 that permit cell rotation and vertical adjustment of the same.

In operation the film is placed on reel 35 and it is threaded through and over sprockets 60, 61 past film gate 62 and threaded upon take-up reel 33. The motor 63 is now started thus actuating the film in a continuous downward movement at a predetermined speed in synchronism with the revolving or scanning disc 29 driven by motor 28. Light passing through framing device and disc and collected by focusing lens 39 is concentrated in a single beam upon the film and passing therethrough it is picked up by the lenses 43 and re-focused upon the photo-electric cell.

All optical equipment and arc are so arranged as to insure the true optical centers of all apparatus by the various means of adjustments about the pivot 3 and longitudinally of the rails 6, lenses, etc. Referring again to the film reel it is mounted in the supply reel housing and the mounting is threaded through and over sprockets passing before the film gate and fire shutter door, over a chain of sprockets and idlers to the take-up reel which is mounted below the feed reel in a metal housing. The film travels in a continuous downward movement at a predetermined speed, the number of pictures per second being recorded upon the speedometer. The film and the scanning disc are operated synchronously. The beam of light is framed by means of the front and back framing mechanism permitting only one aperture at a time in the scanning disc to pass light received through the light aperture 36a thus permitting but one beam of light to be focused upon the film at a time, this beam of light scanning the picture from left to right or vice versa as desired, the film moving downward at the corect speed to permit complete scanning of the picture by one beam of light before a second is received upon the film.

The beam of light after passing through the framing devices is picked up by the focusing lenses and focused upon and through the film and thereafter re-focused upon the photo-electric cell. In the alternative arrangement shown in Fig. 7 the photo-electric cell and the potentiometer and entire circuit are mounted in the door of the film head, the photo-electric cell then being in close proximity to the film. This arrangement eliminates the large photo-electric cell and the re-focusing lens arrangement.

What is claimed is:—

1. In radio photography transmitters, a framework, a film head arranged thereupon and carrying the film mounting, a door for said film head, a photo-electric cell mounted to said door, a potentiometer mounted in said door and in circuit with said photo-electric cell, said electric circuit being made and broken by the closing and opening of said door, and light transmission and focusing means mounted to said framework and associated with said film mounting and cell.

2. In radio photography transmitters, a framework, a film head arranged thereupon and carrying the film mounting, a lens housing mounted to said film head, lenses within said housing, a cell housing mounted to the outer end of said lens housing, a photo-electric cell within said cell housing, a potentiometer within said cell housing in circuit with said photo-electric cell, and light transmission means mounted to said framework.

3. In radio photography transmitters, a framework, a light source mounted thereto, a travelling film mounting upon said framework, a framing support mounted to said framework between said light source and film mounting, said framing support being formed with an arcuate slot, a scanning disc associated with said framing support in such manner that its perforations pass before said slot as said disc is rotated, and light shields adjustably carried by said framing support and associated with the slot thereof whereby the number of scanning disc perforations exposed before said slot simultaneously may be regulated.

4. In radio photography transmitters, a framework, a light source mounted thereto, a traveling film mounting arranged upon said framework, a framing support mounted to said framework between said light source and film mounting, said framing support being formed with an arcuate slot, a scanning disc associated with said framing support in such manner that its perforations pass before said slot as said disc is rotated, light shields upon one side of said framing support for closing off a portion of the slotted portion thereof, and light shields upon the opposite side of said framing support for said scanning disc.

5. In radio photography transmitters, a framework, a film head arranged thereupon and carrying the film mounting, a door for said film head, a photo-electric cell mounted to said door, a potentiometer mounted in said door and in circuit with said photo-electric cell, and light transmission and focusing means mounted to said framework and associated with said film mounting and cell.

6. In radio photography transmitters, a framework, a base adjustably carrying said framework, travelling film mounting carried by said framework, film scanning mechanism carried by said framework and synchronously associated with said travelling film mounting, light admission control mechanism operatively associated with said scanning mechanism whereby a single light beam is admitted continuously thereto, and a reflection shield for said scanning mechanism.

In testimony that I claim the foregoing as my own I have hereto affixed my signature.

VIRGIL ADOLF SCHOENBERG.